April 20, 1937.     P. T. ZIZINIA     2,077,819
SOLUBLE, NONHYGROSCOPIC COCOA AND PROCESS OF PRODUCING SAME
Filed Sept. 23, 1932
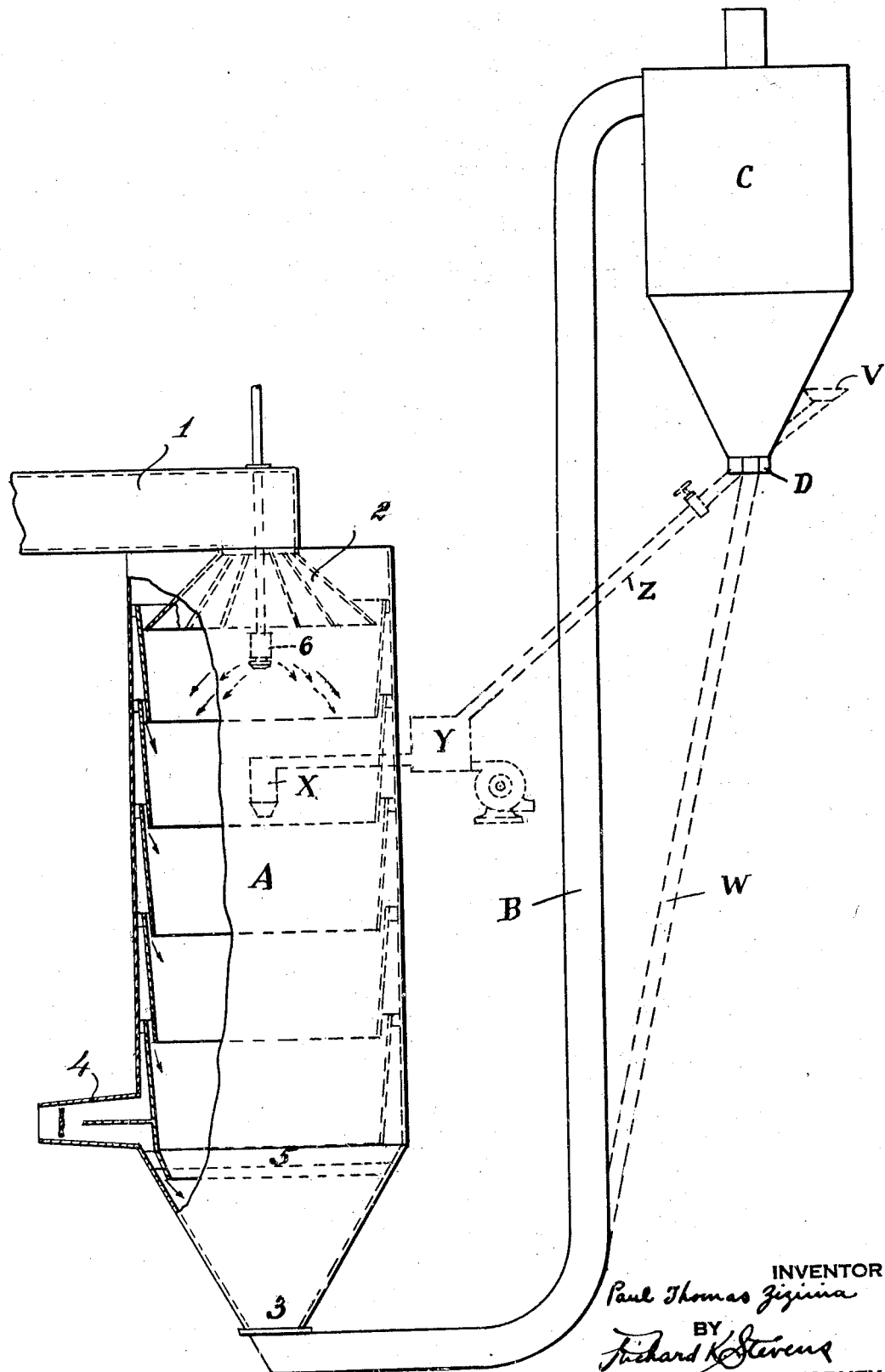
INVENTOR
Paul Thomas Zizinia
BY
Richard K. Stevens
ATTORNEY Patented Apr. 20, 1937

2,077,819

UNITED STATES PATENT OFFICE 2,077,819

SOLUBLE, NONHYGROSCOPIC COCOA AND PROCESS OF PRODUCING SAME

Paul Thomas Zizinia, Belmar, N. J., assignor to Spray Dryer Laboratory Corporation, a corporation of New Jersey Application September 23, 1932, Serial No. 634,610

11 Claims. (Cl. 99—26)

This invention relates to a soluble cocoa which is non-hygroscopic and to methods of producing it.

Cocoa is usually marketed in the form of a finely pulverized dry powder made from roasted and ground cacao beans from which a portion of the cacao butter has been extracted. Because of the substantial insolubility of the cocoa matter in commercial cocoa an extremely fine state of sub-division of the particles is necessary to increase the flavor and digestibility and to minimize the settling out of the particles when mixed with liquids. It is difficult to effect a thorough dispersion of cocoa powder in water or other suitable liquid because the particles tend to lump and flock together and are extremely hard to wet even with active stirring.

Commercial cocoa powder is substantially insoluble, but I have found that by mixing a solution of a suitable soluble substance, sugar for example, with the cocoa powder and then drying the mixture by my process of spray-drying an extremely soluble product results. The soluble materials must be thorough intermixed in solution with the cocoa powder before spray-drying so that when dried each individual spray-dried particle will be composed of proportionate amounts of cocoa powder and of the dried soluble materials with the latter interlaced between and binding together the insoluble cocoa constituents. Such a spray-dried particle is globular and free-flowing and therefore easily dispersible in liquid, and when this spray-dried powder is immersed in water or other suitable liquid the soluble materials which in the process of spray-drying have become solidified and interlaced among the insoluble cocoa constituents readily dissolve and free the insoluble cocoa constituents which are then very thoroughly dispersed in the liquid and being easily wettable in this form the entire mass appears to go into solution and does not lump or ball in the liquid.

The soluble material admixed and spray-dried with the cocoa-powder may be chosen to modify the cocoa flavor while at the same time effecting ready solubility and adding desirable sweetening qualities. For instance, I have used with good results as a substitute for sugar the various starch conversion syrups of which malt syrup, corn syrup and wheat syrup are examples, to impart their peculiar flavors to the final cocoa product. Since the cocoa itself is very bitter, an admixture of sweetening material is not objectionable for commercial purposes. The amount of such materials can be determined to conform to the uses intended.

However, I have also found that when the mixture containing these soluble materials and the soluble ingredients of the cocoa itself is spray-dried, that the spray-dried product is very sensitive to heat and humidity and displays a characteristic tendency to objectionable sticking, gumming and caking when exposed to adverse atmospheric conditions not truly hygroscopic, but so termed herein.

It is therefore a major object of this invention to produce a spray-dried product containing cocoa and a suitable soluble material which product is normally hygroscopic as spray-dried but which when made in accordance with this invention is non-hygroscopic in that it is free-flowing and characterized by the ability of each individual particle to retain its original shape without deformation or joining with neighboring particles under all ordinary conditions to which commercial products of this class are exposed.

I believe that the hygroscopicity of certain products of this class is due to conditions inherent in the spray-drying operation which result in the solidification of the individual particles before a normal, stable arrangement of the constituents of each particle and particularly the crystallizable constituents, has been attained. I have found that if the spray-dried particle is subsequently softened and then necessarily rehardened that the unstable, hygroscopic characteristic disappears and the product becomes stable and non-hygroscopic.

It is a further object of this invention to cause this softening and rehardening of the spray-dried particles by suitable means to allow this stabilizing action to proceed.

During the softening operation the particles are actually soft and sticky and easily deform or flow into adjacent particles to form a caked mass which can only be separated by grinding. Grinding largely destroys the desirable spherical particle form and characteristic rich chocolate color and from the standpoint of the objects of this invention makes the product worthless. I have found that the formation of a caked mass at this stage of the process can be prevented by keeping the particles dispersed in the treating air to minimize contact, or by conveying the particles in ducts at a forward velocity sufficient to substantially prevent contact, or by keeping the particles while being treated separated from each other and spaced apart by an intimate admixture with previously stabilized particles which do not soften under the treating conditions.

It is a further object of this invention to provide methods for effecting and preserving a spaced and non-contacting relation between the particles undergoing treatment.

I am aware that many efforts have been made to produce a soluble cocoa product in dry form. It is not my intention to claim complete solubility, in the strict sense of the term, for the product of this invention because the cocoa itself is substantially insoluble, but it is an object of this invention to produce a dry cocoa powder product by the admixing in liquid form of cocoa powder and other edible materials which will lend solubility to the final product, and spray-drying the mixture so as to produce a very desirable free-flowing powder, the particles of which have a uniform composition, are readily miscible with water or other suitable liquid without substantial separation or settling out of the cocoa ingredient and which product is non-hygroscopic.

In practicing the art of spray-drying I prefer to use what is known as the concurrent downward flow principle and the principle of chilling the powder within the drying chamber. The liquid to be dried is atomized in the upper part of a suitable chamber into a current of heated air and the liquid, resultant powder and heated conveying air proceed concurrently downward thru the drying chamber. Cold air is introduced over the cone bottom to chill the powder and thus prevent lumping and sticking which would normally occur at this point. The powder and air are separated outside of the drying chamber by known means.

Materials of the class above described are difficult to spray-dry, and, irrespective of the temperature used, the spray-dried powder inevitably exits from the usual spray-drying system in an unstable condition and as such is very sensitive to humidity and heat—very hygroscopic.

This unstable hygroscopic condition is due to two causes—partly to incomplete drying, but more especially to incomplete stabilization of the constituents, and particularly the crystallizable constituents, in each spray-dried particle. The time thru the usual spray-drying system is only a few seconds. The act of dehydration itself causes a cooling of the drying gases. In addition, however, to successfully spray-dry this class of materials commercially it is usually necessary to positively chill the powder at the end of the drying period. A preferred method of spray-drying such materials and the chilling of the resultant spray-dried powder at the end of the drying period are herein described. This chilling is obligatory to successfully collect the spray-dried powder. The powder, having been dehydrated at high temperatures, retains the heat and therefore the particles are in a partially molten condition and, as such, are sticky and adhere to anything they come into contact with. The sudden chilling of the drying gases chills and sets each particle and forms a hardened, glazed surface. This not only facilitates the collection of the powder, but as now known to the art, alone makes the spray-drying of this class of materials commercially feasible. This sudden chilling, however, apparently checks the action of stabilization.

Spray-dried powder of the class described as normally produced, is globular, has a hardened, glazed surface and, as such, is free flowing; but, in spite of its apparently hardened surface, the normal spray-dried powder is unstable and is very sensitive to humidity and heat—very hygroscopic. This apparently is due to the fact that the sudden chilling of the molten particles causes a premature solidification and hardening of each minute particle, and this premature hardening prevents normal, stable alignment in the particle structure. The particles at this stage appear to consist of an aggregation of insoluble cocoa constituents bound together by a solidified film of the dried soluble materials which latter I believe to be in an unstable condition. This is shown by the readiness of the particles to absorb atmospheric moisture so that under severe conditions they will run together to form an almost liquid taffy-like mass which is completely unfit for use. Under even the mildest conditions, as for instance in a so-called slack container, the unstabilized powder will form lumps and cakes. As a result it can be packed only in air-tight containers and, particularly in the summmertime, must be used almost immediately on opening.

However, if the powder be subsequently treated sufficiently to soften the film membrane surrounding the insoluble cocoa constituents of the individual particles while such particles are kept separated and apart, the condition existing is relieved and the product becomes stable. This softening of the particle must be accomplished while the particles are kept separated, either dispersed in the conveying treating air or spaced apart by other stabilized particles, as hereinafter described. If the particles are not kept separated, a caking and agglomeration occurs which is objectionable. The softening of the particles permits the solidified membrane surrounding the insoluble cocoa constituents to become supersaturated and then to crystallize out on subsequent cooling. As this surrounding film stabilizes it solidifies in more resistant form and binds together the insoluble constituents in a solid hard stable unit and in that condition the individual particles are much more resistant to heat and/or moisture. This I term "stabilization".

The described process for producing these new stabilized spray-dried cocoa products can be very conveniently carried out in the spray-drying apparatus described and which is first used for spray-drying the product. However, this is to be understood as being merely illustrative and is not intended to be construed as limiting.

Referring to the accompanying diagrammatic drawing as illustrating the preferred spray-drying apparatus, (A) illustrates the drying chamber. (C) illustrates the powder collector, and (B) illustrates the duct connecting the drying chamber with the powder collector. (1) illustrates the duct thru which hot gases are introduced into the top of the drying chamber, (2) illustrates an air distributor, (3) illustrates the exit opening from the cone bottom of the drying chamber, (4) illustrates a cold air duct and (5) illustrates the mechanical means for inducing the cold air sheet over the converging cone, (6) illustrates an atomizing device. In the described method of spray-drying, the hot air is induced at the top of the drying chamber (A) thru the duct (1) and after passing thru the air distributor (2) envelops the atomized liquid from the atomizing device (6). The drying gases, liquid and resulting spray-dried powder progress concurrently downward thru the drying chamber (A) and exit thru (3) to the powder collector (C), from which the powder is removed thru the discharge opening (D). In the progress thru the drying chamber the liquid is substantially dehydrated before it reaches the cooling ring (5) at which point the powder is chilled sufficiently to pass freely over the converging cone and thru the powder duct to the powder collector. The above illustrates the spray-drying process aforementioned.

When using the drying chamber of the same spray-drying apparatus to stabilize the non-stable powder, (X) represents a powder distributor temporarily placed inside the drying chamber. (Y) represents a powder machine to inject the dry but non-stable powder into the drying chamber thru (X), and (Z) represents a supplemental duct connecting the discharge of the powder collector (C) to the powder machine (Y). For an alternative method (W) represents an alternative supplemental duct connecting the discharge of the powder collector (C) with the lower extremity of the powder duct (B) to be used when it is desired to stabilize the powder in the powder duct and powder collector of the spray-drying apparatus.

When the stabilizing operation is conducted in the drying chamber, the non-stable spray-dried powder is first fed into the powder machine (Y) and is thereby dispersed into the drying chamber thru (X). In a very dispersed form with the particles dispersed in the treating and conveying air, the non-stable powder is carried by the treating air thru the drying chamber and thru the powder duct and powder collector. At the point (X) the non-stable powder is enveloped in a current of hot air to initiate the stabilizing reaction. The temperature of the treating air must be sufficient to soften the film membrane of the particles. The partly stabilized powder then proceeds thru the system (A), (B) and (C) and is discharged from the powder collector thru (Z), (Y) and (X), and then again thru the system until such non-stable powder becomes completely stabilized and non-hygroscopic. It is generally desirable to slightly chill the powder as it passes the cooling ring (5) in order to facilitate its passage over the cone and thru the ducts and powder collector. This is a simple, practical method of using the same apparatus for spray-drying and for stabilizing the non-stable powder in suspension. The same sources of air currents and substantially the same equipment are used for both purposes. This method effects a very complete dispersion of the powder in the air and has been found simple and practical. This dispersion of the powder during the process of stabilization is obligatory and prevents agglomeration.

For an alternative method of stabilizing in suspension in a somewhat similar manner using the spray-drying apparatus, the supplemental duct (W) is used. The non-stable spray-dried powder falls by gravity from the powder collector (C) thru the duct (W) to the lower part of the powder duct (B), at which point the powder is entrained in hot upward moving air and thereby conveyed to and thru the powder collector (C). To initiate this alternative method it is necessary to start off with a relatively small quantity of non-stable powder and the temperature in the powder duct (B) must be sufficient to soften the individual particles and also sufficient to expedite and practically complete stabilization and subsequent re-hardening of the particles in the short time of transit up the powder duct (B) into the powder collector (C). So long as the softened particles are separated by being dispersed in the conveying air the process is free from agglomeration, but when the powder enters the powder collector (C) it is there subjected to a very violent circular motion around the periphery of (C) and great care must be used at this point in the process because softened unstabilized powder if brought into the violent amassing contact induced by the action in (C) will cause an agglomeration of particles and a sticking and amassing of the product together and to the side walls of the powder collector (C). For which reason, to initiate this alternative process a small quantity only of non-stable powder must be started with. This small quantity of non-stable powder will be very minutely dispersed in the conveying treating air and will receive sufficient treatment to enter the powder collector (C) in a safe condition and, the time element in the powder collector being relatively considerable, said small quantity of non-stable powder will become stabilized during the process. This small quantity of now stable powder automatically discharges from the powder collector (C) and repeats the cycle thru (W), (B) and (C). While the powder is so circulating, additional non-stable powder is added and receiving the same treatment becomes stabilized, and then still more additional non-stable powder is added until the circulating system contains suspended stabilized powder to its capacity.

Stabilized powder will progress thru the described system at high temperatures without any agglomeration or caking in the powder collectors and without any adherence to the walls of the ducts. On the other hand, non-stable powder alone will agglomerate and cake in the powder collector at relatively low temperatures and will adhere to the walls of the apparatus. Having filled the circulating system to its capacity with spray-dried powder that has become stabilized, a quantity of stabilized powder is drawn off thru (D) and to the circulating remainder a substantially equal quantity of non-stable powder is added thru (V). Dispersed in the large quantity of stabilized powder, the non-stable powder is conveyed successfully thru the circuit and becomes stabilized in one single pass. It has been found feasible to take off over half of the stabilized powder and add to the circulating remainder more than half of non-stable and this large quantity of non-stable powder will then in a single pass thru the circuit become stabilized.

Unless stabilized powder be freely mixed with non-stable powder only a relatively small quantity of non-stable powder at a time can be stabilized by this process because the circular action in the powder collector is so violent and amassing that agglomeration and adherence would occur. But, even when the non-stable powder is amassed in the powder collector, if it is separated and spaced apart by a sufficient quantity of stabilized powder admixed therewith, it is enabled to pass safely thru the circuit and become stabilized in a single pass.

This process can be carried on indefinitely and continuously and in continuous operation a large quantity of stabilized spray-dried powder can be continuously produced.

As aforestated, so long as the non-stable powder while being stabilized is sufficiently dispersed and spaced apart by the circulating air or by stabilized powder, no agglomeration occurs. The size of the spray-drying chamber is sufficient to permit of a large volume of non-stable powder being continuously stabilized therein while dispersed in the circulating and treating air, but, when a small tower or duct is used then only a small quantity of non-stable powder can be handled at one time, unless properly admixed and kept separate and spaced apart by stabilized powder as aforesaid.

The two above-described methods of stabilizing the non-stable but once spray-dried powder are intended only to illustrate a method of stabilizing in the same apparatus as is used for spray-drying. Other simple and perhaps more practical methods can be devised.

It is also feasible to stabilize the non-stable spray-dried powder in mass while in repose, but this method causes objectionable agglomeration and necessitates subsequent grinding. This agglomeration can be diminished if the non-stable powder be spaced apart by being thoroughly admixed with stabilized powder as is hereinabove described to be necessary when large quantities of non-stable powder are to be stabilized in the powder collector. When the non-stable powder is stabilized in the powder duct and powder collector it is moving very rapidly in suspension dispersed in the conveying air and while so doing a proper amount of stabilized powder present and admixed with the non-stable powder will prevent agglomeration even when subjected to the violent amassing action of the powder collector, but if the non-stable powder be stabilized in repose in mass more or less agglomeration is unavoidable.

This softening of the particle may also be accomplished by proper humidification and when once the particle has been softened either by heat or humidity and then is permitted to reharden the product becomes non-hygroscopic.

It is not necessary that the specified treatment be applied immediately upon formation of the spray-dried product; the product may be treated subsequently and even after an interval of months. As stated, it is requisite, however, to keep the non-stable particles separated and spaced apart during the softening, stabilizing period.

The terms "stabilized", "hygroscopic" and "non-hygroscopic", as used in the claims are intended to be used in the sense hereinbefore specifically defined.

I claim:

1. A process for treating a previously spray dried mixture comprising cacao and an edible crystallizable material to render the same substantially stable and non-hygroscopic which comprises heating the dried material while in a dispersed state thereby softening the material, and permitting the softened material to harden.

2. A process for treating a previously spray dried mixture comprising cacao and an edible crystallizable material to render the same substantially stable and non-hygroscopic which comprises exposing the dried material to moisture while in a dispersed state thereby softening the material, and permitting the softened material to harden.

3. A process for treating a previously spray dried mixture comprising cacao and an edible crystallizable material to render the same substantially stable and non-hygroscopic which comprises exposing the dried material to a softening action by passing the dried material through a heating zone by means of a heated gas at sufficient velocity to maintain the material in a state of dispersion, thereby softening the material without permitting it to agglomerate, and permitting the softened material to harden.

4. A process for treating a previously spray dried mixture comprising cacao and an edible crystallizable material to render the same substantially stable and non-hygroscopic which comprises maintaining the dried material in a dispersed state by mixing it with similarly dried material which has been previously exposed to a stabilizing treatment and thereby rendered substantially non-hygroscopic, exposing the mixture of stabilized and unstabilized materials to a heating action thereby softening the unstabilized material, and permitting the softened material to harden.

5. The process of producing a relatively soluble and substantially non-hygroscopic edible compound comprising cacao and an edible crystallizable material which comprises rendering the materials fluid, passing the fluid through a spray drying chamber for the purpose of obtaining a relatively dry material, recycling the dried material through the drying chamber for the purpose of softening the dried material, maintaining the material in a dispersed state while being recycled, and permitting the softened material to harden.

6. The process of producing a relatively soluble and substantially non-hygroscopic edible compound comprising cacao and an edible crystallizable material which comprises rendering the materials fluid, passing the fluid through a spray drying chamber for the purpose of obtaining a relatively dry material, recycling the dried material through the drying chamber for the purpose of softening the dried material, maintaining the material in a dispersed state while being recycled, slightly chilling the softened material, and permitting the softened material to harden.

7. The process of producing a relatively soluble and substantially non-hygroscopic edible compound comprising cacao and an edible crystallizable material which comprises rendering the materials fluid, passing the fluid through a spray drying chamber for the purpose of obtaining a relatively dry material, repeatedly recycling the dried material through the drying chamber for the purpose of softening the dried material, maintaining the material in a dispersed state while being recycled, and repeatedly permitting the softened material to harden.

8. A process for treating a previously spray dried mixture comprising cacao and an edible crystallizable material to render the same substantially stable and non-hygroscopic which comprises exposing a relatively small portion of the dried material to a heating medium while maintaining the same in a dispersed state by means of the heating medium, thereby softening the material, permitting the softened material to harden, whereby the treated and hardened portion of the material is rendered substantially stable and non-hydroscopic as well as soluble, mixing additional dried material with the stabilized material, and exposing the mixture of stabilized and unstabilized materials to the softening and hardening action.

9. The process of producing a relatively soluble and substantially non-hygroscopic edible compound comprising cacao and a crystallizable sugar which comprises rendering the materials fluid, exposing the fluid to a spray drying treatment, thereby obtaining a substantially dry soluble and hygroscopic material comprising particles of substantially globular form, and reheating the dried material to a temperature sufficient to soften the sugar, but insufficient to cause any substantial deformation of the globular particles, and maintaining the material in a subdivided state during the reheating step.

10. A relatively soluble and substantially non-hygroscopic cocoa compound in the form of separate globular particles comprising an aggregation of insoluble cacao constituents having a film of soluble crystallized sugar surrounding the same.

11. A relatively soluble and substantially non-hygroscopic cocoa compound in the form of separate globular particles comprising an aggregation of insoluble cacao constituents having a film of soluble crystallized sugar interlaced between and substantially surrounding the same and binding the constituents together.

PAUL T. ZIZINIA.